United States Patent
Repossi

(10) Patent No.: US 10,440,889 B2
(45) Date of Patent: Oct. 15, 2019

(54) STAR-WHEEL RAKE

(71) Applicant: REPOSSI MACCHINE AGRICOLE S.r.l., Casorate Primo (IT)

(72) Inventor: Gabriele Repossi, Casorate Primo (IT)

(73) Assignee: REPOSSI MACCHINE AGRICOLE S.r.l., Casorate Primo (IT)

( * ) Notice: Subject to any disclaimer, the term of this patent is extended or adjusted under 35 U.S.C. 154(b) by 198 days.

(21) Appl. No.: 15/609,678

(22) Filed: May 31, 2017

(65) Prior Publication Data

US 2018/0343802 A1 Dec. 6, 2018

(51) Int. Cl.
*A01D 78/00* (2006.01)
*A01D 78/16* (2006.01)
*A01D 78/14* (2006.01)

(52) U.S. Cl.
CPC ............. *A01D 78/14* (2013.01); *A01D 78/16* (2013.01)

(58) Field of Classification Search
CPC ....... A01D 78/14; A01D 78/16; A01D 78/148
USPC .......................................... 56/366, 372, 377
See application file for complete search history.

(56) References Cited

U.S. PATENT DOCUMENTS

| 2,796,723 | A | * | 6/1957 | Smith | A01D 78/16 56/377 |
| 2,827,754 | A | * | 3/1958 | Hill | A01D 78/16 56/377 |
| 3,117,407 | A | | 1/1964 | Van Der Lely | |
| 3,243,946 | A | * | 4/1966 | Worrel | A01D 78/16 56/377 |
| 3,478,502 | A | * | 11/1969 | Orthman | A01D 78/16 56/366 |

FOREIGN PATENT DOCUMENTS

| BE | 523 976 | 11/1953 |
| GB | 826 541 | 1/1960 |
| GB | 852 353 | 10/1960 |
| NL | 7 310 101 | 9/1973 |

* cited by examiner

*Primary Examiner* — Robert E Pezzuto
(74) *Attorney, Agent, or Firm* — Leason Ellis LLP

(57) ABSTRACT

A star-wheel rake including a frame, at least one front rake wheel and a rear drive wheel, coupled with each other so that the rotation of the rear drive wheel causes the rotation of the front rake wheel and connected to the frame so that the front rake wheel is lifted from the ground when the rear drive wheel is in contact with the ground.

15 Claims, 5 Drawing Sheets

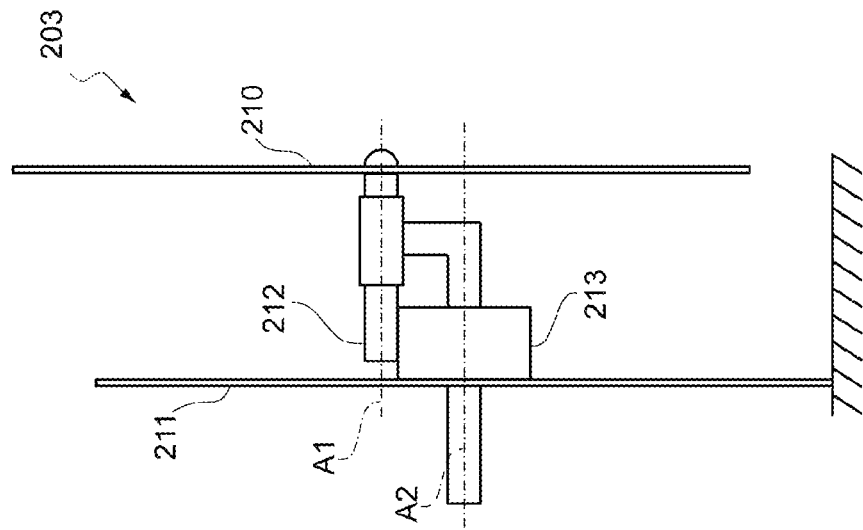
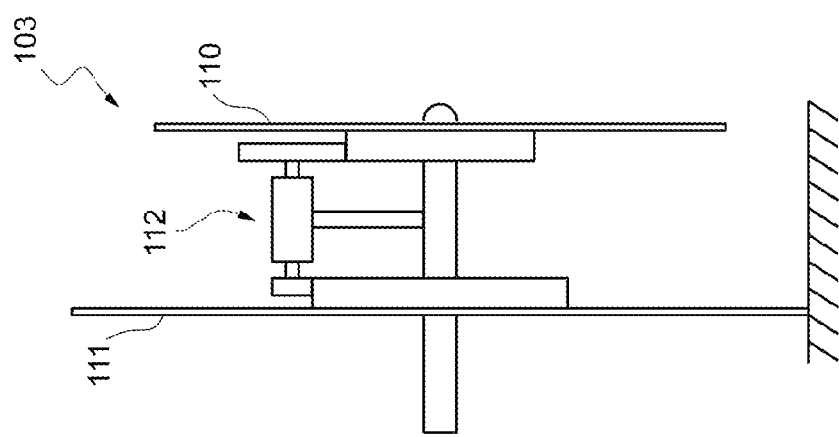

STAR-WHEEL RAKE

CROSS-REFERENCE TO RELATED APPLICATIONS

This application is related to Italian Patent Application No. 102015000021005 filed on Jun. 5, 2015, the disclosure of which is incorporated by reference.

TECHNICAL FIELD

The present invention relates to a star-wheel rake.

BACKGROUND OF THE INVENTION

As is known, rakes are used in farming for turning over forage after cutting and accumulating the processed material in rows, normally referred to as windrows.

One of the commonly used rakes is the star-wheel type.

A star-wheel rake comprises a plurality of rakes or star wheels, which are idly mounted on a frame about respective parallel axes and, in practice, form rotating rakes. The rake wheels, with the same diameter, are oblique with respect to a direction of travel in the working configuration and are set in rotation by contact with the ground during the forward travel of the rake. Each rake wheel is equipped with an outer ring of coplanar teeth, shaped to collect the forage and move it sideways due to the combine effect of the rake advancing in the direction of travel and the rotation of the rake wheel about the respective axis. Furthermore, the rake wheels are placed side by side so that the forage moved from the more forward wheels with respect to the direction of travel is collected by the more rearward adjacent wheels. In this way, the rake wheels define a working front and move the forage collected on the working front during forward movement towards a discharge side of the rake, where a windrow is formed. The upstream (more forward) wheels along the working front can partially overlap the immediately adjacent more downstream (more rearward) wheels, to avoid losing the material being processed.

Star-wheel rakes have the advantage of a very simple structure, which does not require specially provided drives for the rake wheels. As already mentioned, the rake wheels are actually idle and rotate due the effect of contact of the teeth with the ground during forward movement. Star-wheel rakes are therefore inexpensive and relatively immune to malfunctioning, and this makes their use fairly widespread.

However, the same mechanism that drives the rake wheels, also causes soil and dust to be raised, which mixes with the collected forage and accumulates in the windrows. Dirt in the forage is obviously unwelcome, because it may interfere with the aeration and drying process and, in general, degrades the quality of the product. Thus, on one hand, star-wheel rakes are inexpensive and good value for money, but on the other, the results they provide are often unsatisfactory.

SUMMARY OF THE INVENTION

The object of the present invention is therefore to provide a star-wheel rake that enables overcoming or at least mitigating the described limitations and, in particular, allows significantly reducing the accumulation of dirt in the windrows.

According to the present invention, a star-wheel rake is provided as defined in 1.

BRIEF DESCRIPTION OF THE DRAWINGS

The present invention will now be described with reference to the accompanying drawings, which illustrate some non-limitative embodiments, in which:

FIG. 3 is a simplified side view of a detail of a star-wheel rake according to a different embodiment of the present invention;

FIG. 4 is a simplified side view of a detail of a star-wheel rake according to a further embodiment of the present invention;

DETAILED DESCRIPTION OF THE INVENTION

Figure 1:
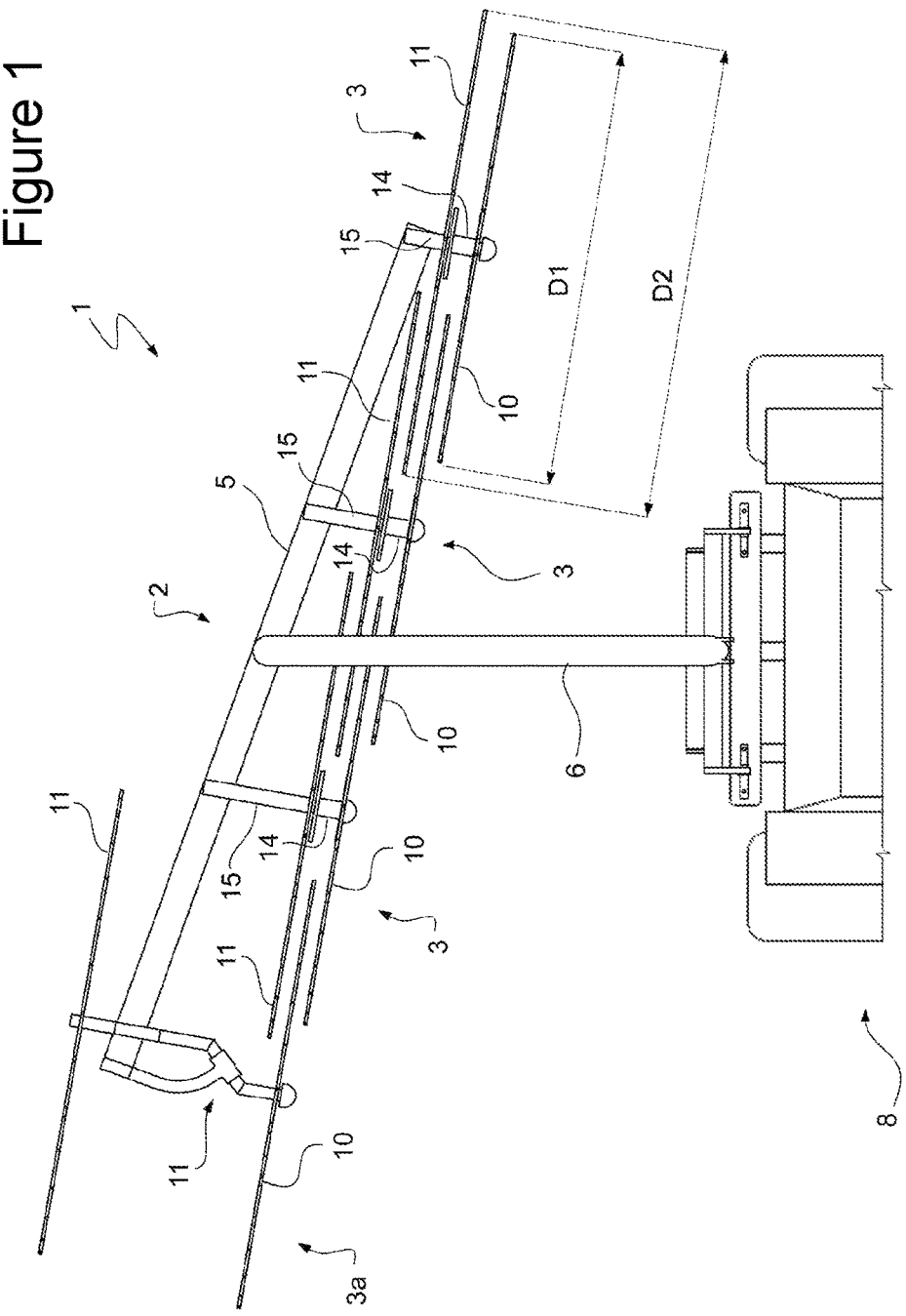
FIG. 1 is a plan view from above of a star-wheel rake according to one embodiment of the present invention.
Figure 2:
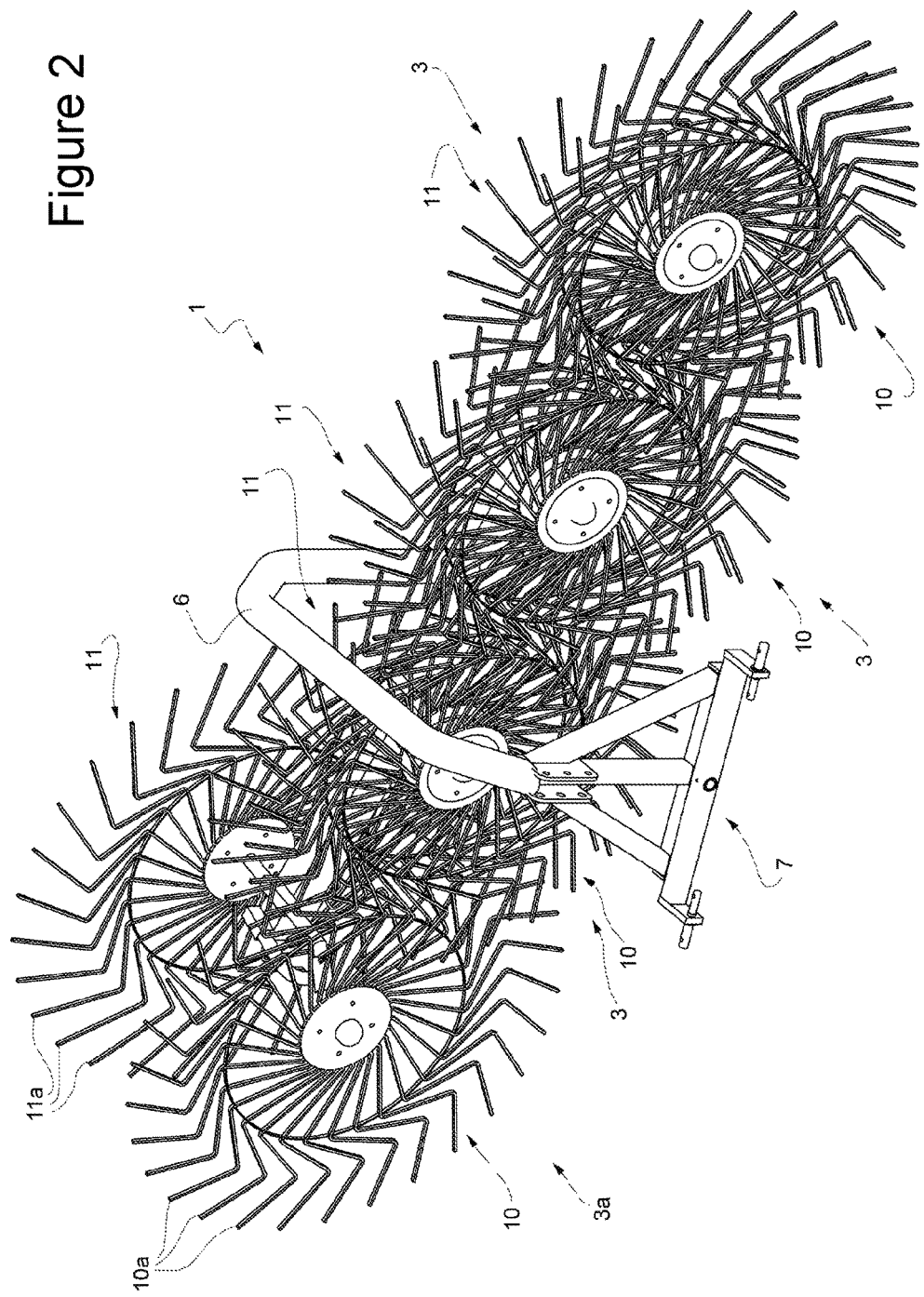
FIG. 2 is a perspective view of the rake in FIG. 1.

Referring to FIGS. 1 to 3, a star-wheel rake according to one embodiment of the present invention is indicated by reference numeral 1 and comprises a frame 2 and a plurality of raking units 3 mounted side by side on the frame 2.

In the example shown, the frame 2 comprises a support bar 5 and a drawbar 6. The support bar 5 extends transversely in a travel direction D of the rake 1 in the working configuration and supports the raking units 3 in a rotational manner.

The drawbar 6 has a first end fastened to the support bar 5 and a second end fitted with a three-point hitch 7 for connection to a means of transport, for example a tractor 8 (partly and schematically shown only in FIG. 1). Furthermore, the drawbar 6 has an arc-like shape and extends above the raking units 3.

In the embodiment shown here, the rake 3 is adapted to be carried by the tractor 8 and therefore it has no support wheels. Nevertheless, it is understood that the rake could still be towed, in which case the frame could be provided with one or more support wheels.

Each raking unit 3 comprises a front rake wheel 10 and a rear drive wheel 11. It is understood that hereinafter the terms "front" and "rear" and their derivatives are with reference to the travel direction D in the working configuration. For example, the front end of the drawbar 6 carries the three-point hitch 7, while the rear end is fastened to the support bar 5.

The front rake wheels 10 may be conventional rake wheels (also known as star wheels). In particular, the front rake wheels 10 are substantially planar and are provided with respective outer rings of teeth 10a, shaped so as to collect the forage and move it sideways during forward movement of the rake 1.

The rear drive wheels 11 may be of the same type as the front rake wheels 10, of a different size in the embodiment described and illustrated herein. In this case, in use, the teeth 11a are in contact with the ground to set the rear drive wheels 11 in rotation when the rake proceeds in the travel direction D.

The front rake wheels 10 and the rear drive wheels 11 of the rake 1 are mounted on the frame 2 with respective parallel rotation axes.

The front rake wheel 10 and the rear drive wheel 11 of each raking unit 3 are coupled to each other such that the rotation of the rear drive wheel 11, due to the effect of contact with the ground during forward movement, causes rotation of the front rake wheel 10. Furthermore, the two wheels are arranged such that the front rake wheel 10 is raised when the rear drive wheel 11 is in contact with the ground.

In one embodiment, the front rake wheel 10 and the rear drive wheel 11 of each raking unit 3 (except for a raking unit 3a placed at a discharge side of the rake 1) are coaxial and angularly fixed with respect to each other, even though idly mounted as a whole on the frame 2. For example, the front rake wheel 10 and the rear drive wheel 11 are mounted on a same hub 14, which is in turn fitted on a respective shaft 15 fastened to the frame 2. Furthermore, the front rake wheel 10 has a smaller diameter D1 than the diameter D2 of the rear drive wheel 11.

In the raking unit 3a on the discharge side of the rake 1, the front rake wheel 10 and the rear drive wheel 11 have respective parallel and separate rotation axes. In particular, the rotation axis of the rear drive wheel 11 of the raking unit 3a is offset with respect to the rotation axis of the front rake wheel 10 and displaced towards the adjacent raking unit 3. In practice, with respect to a direction of flow of the processed forage, the rotation axis of the rear drive wheel 11 of the raking unit 3a is displaced upstream with respect to the rotation axis of the front rake wheel 10. In one embodiment, the connection between the front rake wheel 10 and the rear drive wheel 11 of the raking unit 3a is obtained by a double cardan joint 12. Alternatively, it is possible to use other transmission means, such as a crown and pinion coupling or a belt coupling. Furthermore, the rear drive wheel 11 of the raking unit 3a is arranged at the rear of the support bar 5 of the frame 2, while all the other wheels 10, 11 are arranged at the front. In a different embodiment, not shown, the rear drive wheels 11 of all the raking unit 3a are arranged at the rear of the support bar 5 of the frame 2.

The rotation axes of the front rake wheels 10 and of the rear drive wheels 11 are parallel to each other and oblique with respect to the travel direction D of the rake 1 in the working configuration. The front rake wheels 10 are arranged side by side and partially overall each other and define a working front, between the discharge side (where raking unit 3a is positioned) and an upstream side opposite to the discharge side, and a flow direction F along the working front from the upstream side towards the discharge side. The rake wheels 10 that are more upstream with respect to the flow direction F are arranged in front of rake wheels 10 immediately downstream, so as to facilitate collection of the forage.

In one embodiment in particular, the front rake wheel 10 of each raking unit 3 has a respective portion interposed between the front rake wheel 10 and the rear drive wheel 11 of the respective adjacent upstream raking unit 3. Similarly, the rear drive wheel 11 of each raking unit 3 has a respective portion interposed between the front rake wheel 10 and the rear drive wheel 11 of the respective adjacent downstream raking unit 3.

In use, the rake 1 is connected to the tractor 8 via a three-point hitch 7 and is carried at a height such that the rear drive wheels 11 of the raking units 3 are in contact with the ground. The rear drive wheels 11 rotate due to the combined effect of moving forward in the travel direction D and of contact with the ground, causing the respective front rake wheels 10 to be driven in rotation. The forage is collected by the front rake wheels 10 along the working front and moved along the flow direction F to the discharge side, where a windrow is formed. The front rake wheels 10, having a smaller diameter with respect to the rear drive wheels 11, are raised above the ground and do not raise dirt when working. Obviously, the contact of the rear drive wheels 11 with the ground raises dirt and soil, which however cannot mix with the forage transferred by the front rake wheels 10 due to the forward movement of the rake 1 in the direction of travel. Furthermore, the rear drive wheel 11 of the raking unit 3a is offset towards the inside of the working front with respect to the corresponding front rake wheel 10 and can discharge the dirt at a certain distance from the windrow without mixing it with the forage.

The rake 1 thus has the advantages of star-wheel rakes (in particular the simple structure and low costs) and, in addition, enables drastically reducing contamination of the forage with dust, soil and other dirt.

The fact of having separate wheels for driving force and for forage collection also allows greater freedom in the design of the rake. For example, the rear drive wheels could have different characteristics with respect to the front rake wheels and be specifically designed to improve rolling and reduce dust cloud formation. The front rake wheels could instead be optimized for the collection and transfer of forage.

FIG. 3 shows a raking unit 103 of a star-wheel rake according to a different embodiment of the invention. The raking unit 103 comprises a front rake wheel 110 and a rear drive wheel 111, which are coaxial and are coupled to each other so that the rotation of the rear drive wheel 111, due to the effect of contact with the ground during forward movement, causes rotation of the front rake wheel 110. In this case, the front rake wheel 110 and the rear drive wheel 111 are connected to each other by a coaxial speed reducer 112 (only shown schematically) and can therefore rotate at different speeds.

FIG. 4 shows a raking unit 203 of a star-wheel rake according to a further embodiment of the invention. The raking unit 203 comprises a front rake wheel 210 and a rear drive wheel 211 having respective parallel and separate rotation axes A1 and A2. In particular, in the working configuration, the rotation axis A1 of the front rake wheel 210 is higher off the ground with respect to the rotation axis A2 of the rear drive wheel 211. The front rake wheel 210 and the rear drive wheel 211 are also coupled by cogwheels 212 and 213 fixed to respective hubs. In an alternative embodiment, not shown, the connection may be implemented by drive belts. The front rake wheel 210 is set in rotation by the rotation of the rear drive wheel 211, in turn caused by movement along the direction of travel and from contact with the ground. In this case, the front rake wheel 210 can have the same diameter as the rear drive wheel 211 or one even slightly larger.

Figure 5:
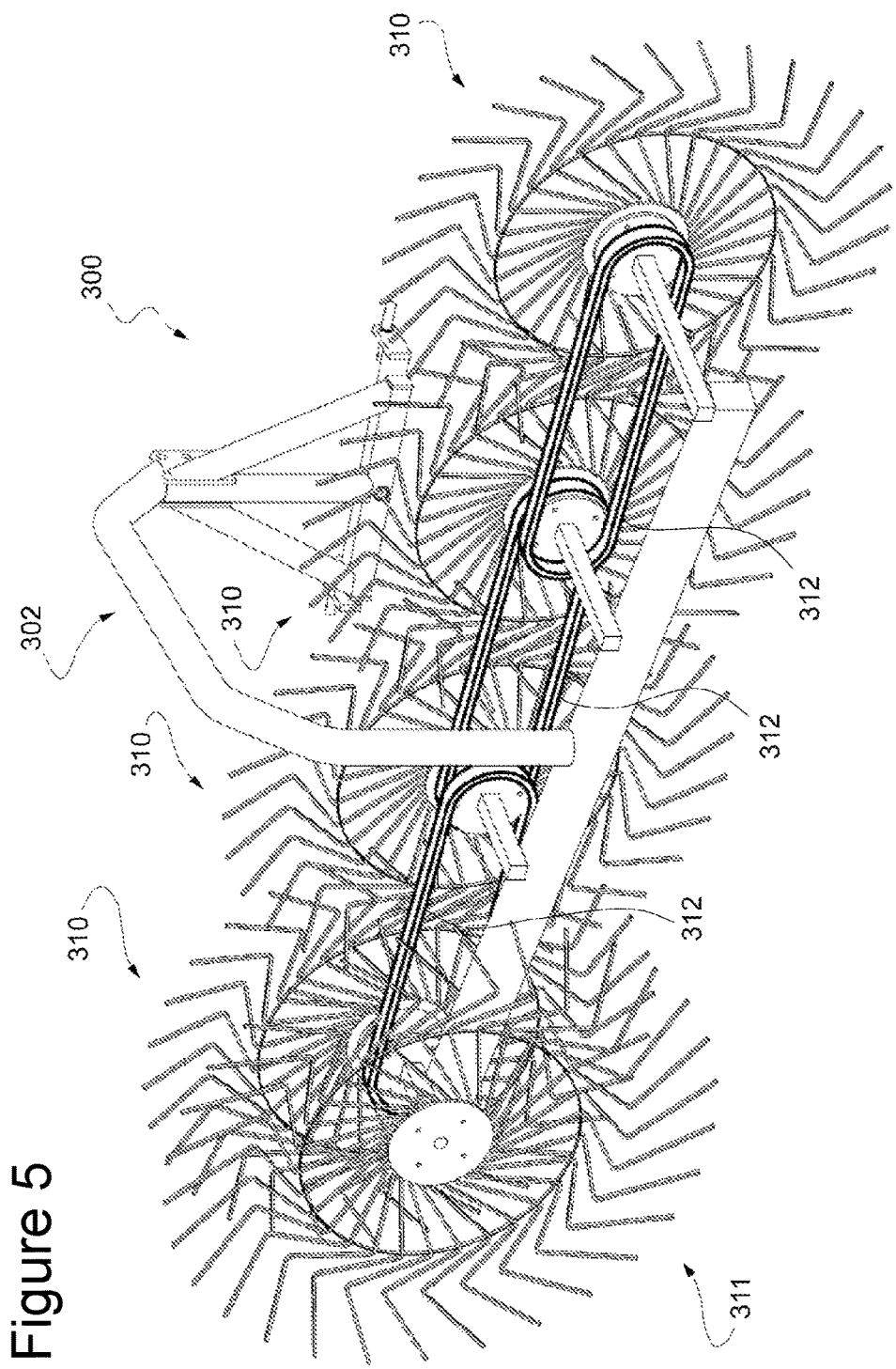
FIG. 5 is a perspective view of a star-wheel rake according to a different embodiment of the present invention.

According to the embodiment shown in FIG. 5, a star-wheel rake 300 comprises a frame 302 and a single raking unit 303 that includes a plurality of front rake wheels 310 coupled to a same rear drive wheel 311. The front rake wheels 310 and the rear drive wheel 311 are mounted on the frame 302 with respective parallel rotation axes. The front rake wheels 310 and the rear drive wheel 311 are arranged such that the front rake wheels 310 are raised when the rear drive wheel 311 is in contact with the ground.

Furthermore, the front rake wheels 310 are coupled to the rear drive wheel 311 such that the rotation of the rear drive wheel 311, due to the effect of contact with the ground during forward movement, causes rotation of all the front rake wheels 310 of the raking unit 303. In one embodiment in particular, the rear drive wheel 311 is rigidly coupled to one of the front rake wheels 310 and the front rake wheels 310 are coupled to each other, for example by drive belts 312. Advantageously, the front rake wheel 310 rigidly coupled to the rear drive wheel 311 is not the one positioned on the discharge side of the rake 300, to avoid contamination of the forage collected in the windrow. However, in an embodiment not shown, the rear drive wheel can transmit drive to the front rake wheel on the discharge side by drive members that allow offsetting the rotation axes, so that the rear drive wheel can be distanced from the discharge side, as in the raking unit 3a in FIG. 1. Also in this case, the connection between the rear drive wheel and the front rake wheel may be obtained, for example, by a double cardan joint, crown and pinion coupling or a belt coupling.

In an embodiment that is not shown, a star-wheel rake may comprise a plurality of raking units arranged side by side to form a working front and each having a plurality of front rake wheels (for example, two or three) coupled to a same rear drive wheel.

Figure 6:
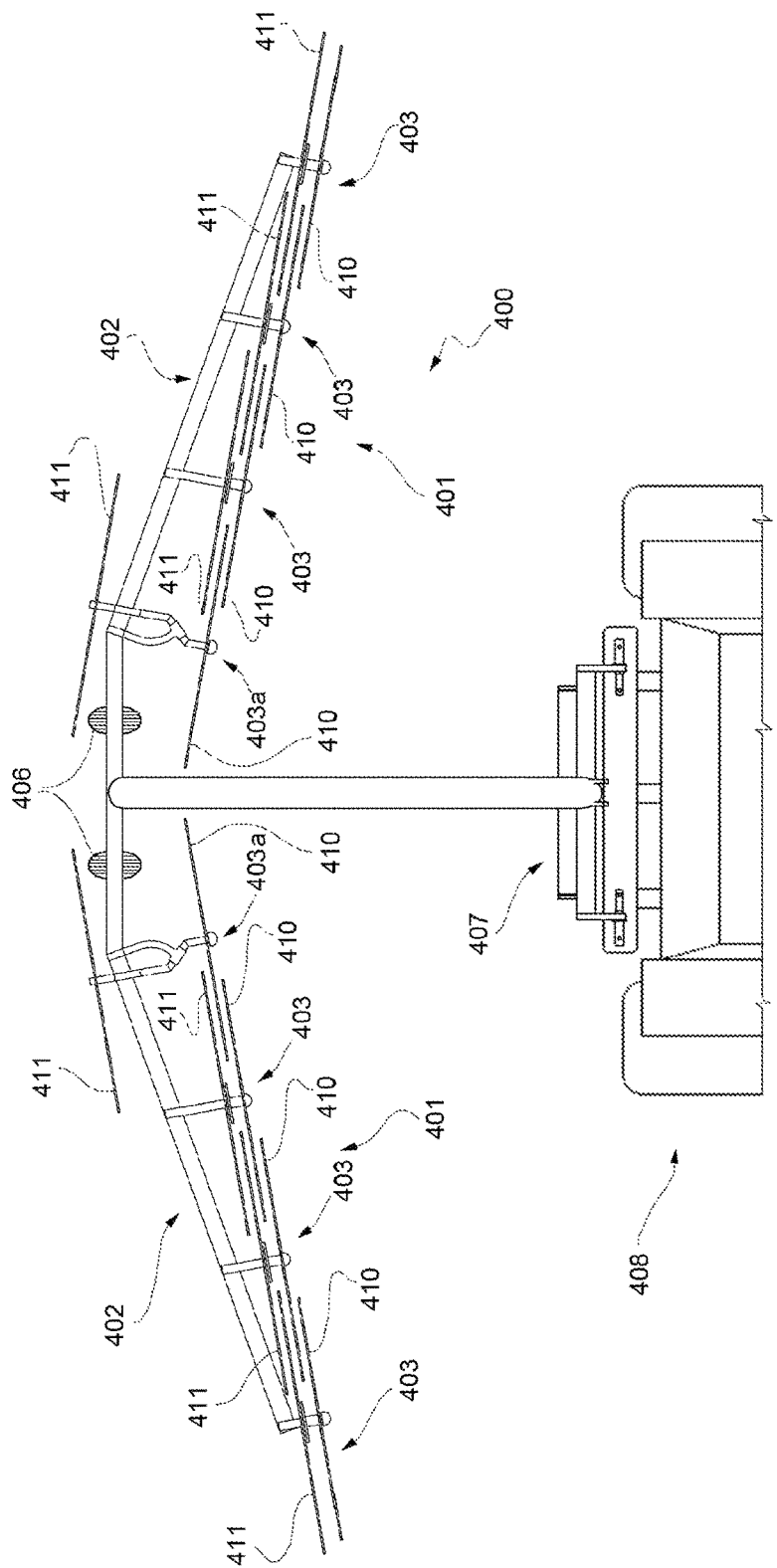
FIG. 6 is a plan view from above of a multiple rake according to an embodiment of the present invention.

FIG. 6 shows a multiple rake 400 that comprises a plurality of star-wheel rakes 401, substantially of the type already described, which are connected to each other. In particular, each rake 401 comprises a frame 402 and raking units 403 mounted on the frame 402. The raking units 403 each comprise a front rake wheel 410 and a rear drive wheel 411. The frames 402 are rigidly connected to each other and supported by wheels 406. A common three-point hitch 407 (or, in alternative, a tow hitch, not shown) enables connection to a tractor 408.

Finally, it is clear that modifications and variants can be made to the described rake, without departing from the scope of the present invention, as defined in the appended claims.

The invention claimed is:

1. A star-wheel rake comprising:
a frame (2; 302; 402);
at least one raking unit fitted to the frame, each racking unit including at least one front rake wheel and a rear drive wheel, coupled with each other so that the rotation of the rear drive wheel causes the rotation of the at least one front rake wheel and connected to the frame so that the at least one front rake wheel is lifted from the ground when the rear drive wheel is in contact with the ground; and
wherein the rear drive wheel and the at least one front rake wheel of each raking unit have rotation axes parallel to each other and transverse to a travelling direction (D) in a working configuration.

2. The rake according to claim 1, wherein the rear drive wheel and the at least one front rake wheel of the at least one raking unit are coaxial and the front rake wheel has a diameter smaller than a diameter of the rear drive wheel.

3. The rake according to claim 1, wherein the rear drive wheel and the at least one front rake wheel of the at least one raking unit are angularly fixed with respect to each other.

4. The rake according to claim 1, wherein the at least one front rake wheel and the rear drive wheel of each raking unit are idly mounted on the frame.

5. The rake according to claim 1, wherein the at least one raking unit comprises a plurality of raking units and the front rake wheels of the plurality of raking units define a working front, between a discharge side and an upstream side opposite the discharge side, and a flow direction (F) along the working front from the upstream side towards the discharge side.

6. The rake according to claim 5, wherein the front rake wheels of the plurality of raking units partially overlap and are arranged in front of the front rake wheels of respective adjacent raking units set immediately downstream along the flow direction (F).

7. The rake according to claim 6, wherein the at least one front rake wheel of each of the plurality of raking units has a respective portion interposed between the at least one front rake wheel and the rear drive wheel of a respective upstream adjacent raking unit.

8. The rake according to claim 5, wherein the at least one front rake wheel and the rear drive wheel of the raking unit on the discharge side have respective parallel and separate rotation axes.

9. The rake according to claim 8, wherein the at least one front rake wheel and the rear drive wheel of the raking unit on the discharge side are coupled to each other by a double cardan joint.

10. The rake according to claim 6, wherein in the raking unit on the discharge side, the rear drive wheel has its own rotation axis offset towards the upstream side along the flow direction (F) with respect to a rotation axis of the at least one front rake wheel.

11. The rake according to claim 1, comprising a plurality of front rake wheels coupled to the rear drive wheel so that the rotation of the rear drive wheel causes the rotation of all the front rake wheels coupled thereto.

12. The rake according to claim 11, including transmission members between the front rake wheels coupled to the rear drive wheel.

13. A multiple rake comprising a plurality of star-wheel rakes according to claim 1 connected to one another.

14. A star-wheel rake comprising:
a frame; and
at least one raking unit fitted to the frame, each racking unit including at least one front rake wheel and a rear drive wheel, coupled with each other so that the rotation of the rear drive wheel causes the rotation of the at least one front rake wheel and connected to the frame so that the at least one front rake wheel is lifted from the ground when the rear drive wheel is in contact with the ground;
wherein the rear drive wheel and the at least one front rake wheel of at least one raking unit are coaxial and the at least one front rake wheel has a diameter smaller than a diameter of the rear drive wheel.

15. A star-wheel rake comprising:
a frame; and
at least one raking unit fitted to the frame, each racking unit including at least one front rake wheel and a rear drive wheel, coupled with each other so that the rotation of the rear drive wheel causes the rotation of the at least one front rake wheel and connected to the frame so that the at least one front rake wheel is lifted from the ground when the rear drive wheel is in contact with the ground;
wherein both the at least one front rake wheel and the rear drive wheel comprise star wheels.

* * * * *